May 12, 1931.  F. C. PALENSKE ET AL  1,804,799
RUBBER STRIPPING FOR DOORS OR WINDOWS
Filed April 5, 1929
Fig.1
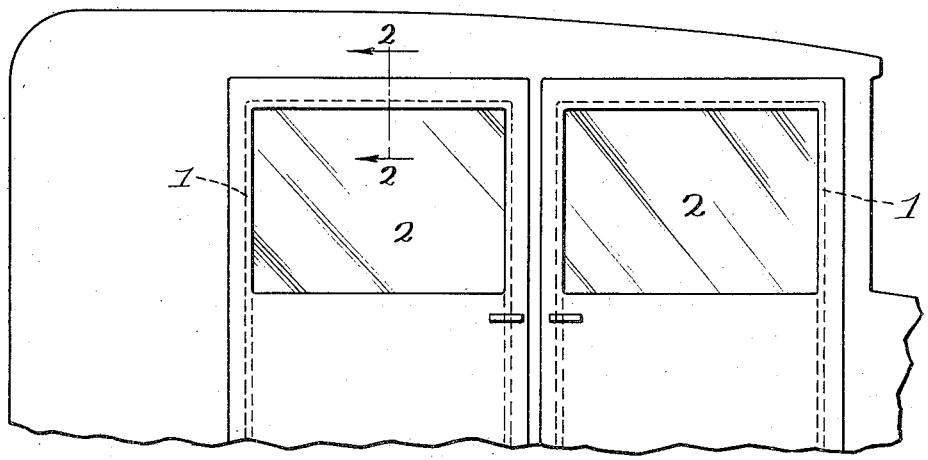
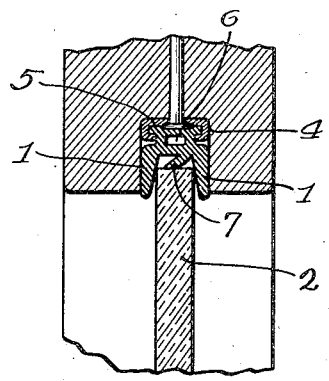
Fig.2
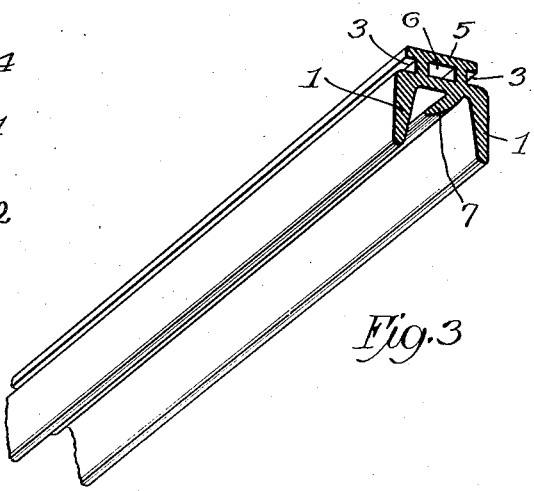
Fig.3
Inventors
Frederick C. Palenske
William A. Robbins
By Arthur F. Durand
Atty.

Patented May 12, 1931

1,804,799

UNITED STATES PATENT OFFICE

FREDERICK C. PALENSKE, OF ST. JOSEPH, AND WILLIAM A. ROBBINS, OF BENTON HARBOR, MICHIGAN

RUBBER STRIPPING FOR DOORS OR WINDOWS

Application filed April 5, 1929. Serial No. 352,633.

This invention relates to rubber strips for use in forming tight joints in windows and doors and other places, more particularly for the sliding windows of motor vehicles.

Generally stated, therefore, the object of the invention is to provide a rubber strip, in the nature of a weather strip, that will form a tight joint between the window frame and the edge of the glass, so that when the sliding window is closed a tight joint will be formed, for example, between the upper edge of the glass and the so-called header in the window frame above, or in any other place where a tight joint of this kind is desired.

It is also an object to provide certain details and features of construction tending to increase the general efficiency and desirability of a rubber weather strip of this particular character.

To these and other useful ends, the invention consists in matters hereinafter set forth and claimed and shown in the accompanying drawings in which—

Fig. 1 is a side elevation of the upper body portion of a motor vehicle, showing a sliding window having rubber stripping at the edges thereof, involving the principles of the invention.

Fig. 2 is an enlarged detailed section on line 2—2 in Fig. 1.

Fig. 3 is a perspective view of a fragment of the said rubber strip.

As thus illustrated, the rubber strip is channel-shaped in cross section, having the two flanges 1 thereof spaced apart to receive the glass 2 between them, as shown in Fig. 2 of the drawings. The rubber strip is also formed, preferably, with side grooves 3 to receive the edges of the metal frame 4 as shown, whereby the rubber strip is held in position in the window construction. The base portion 5 of the rubber strip is also preferably provided with a longitudinal opening 6, to make the strip more yielding and resilient. Between the two flanges 1 a longitudinal rib 7 is provided as shown. Preferably, this rib is oblique, and is adapted at its edge to engage the edge of the glass 2, when the latter slides upward to close the window.

The rib 7 will yield sufficiently to insure a tight joint between the edge of the glass and the rubber strip, throughout the entire length of the edge of the glass, very obviously, notwithstanding that the rubber strip may not be perfectly straight.

The difficulty with the ordinary rubber strips, for this purpose, is that many times when they are fastened in place they are not straight, so that the surface to be engaged by the edge of the glass is wavy or uneven, with the result that when the glass slides upward its upper edge will strike certain portions of the rubber strip, while other portions of the edge of the glass will not be engaged by the rubber, thus preventing formation of a tight joint between the strip and the glass for the entire length of the edge of the glass. However, with the provision of yielding means between the edge of the glass and the bottom of the channel in the rubber strip, it is obvious that any unevenness in the length of the strip will not prevent the formation of a tight joint between the rubber and the glass, for the full length of the edge of the glass, inasmuch as the rib 7 will yield readily until all portions of the edge of the glass are firmly engaged by the rubber strip. Without the rib 7, the rubber strip shown and described will be liable in some cases to fail to form a continuous tight joint between the edge of the glass and the rubber, as it would require considerable compression of different portions of the base of the strip, in cases where the underside of the strip was uneven, in order to force the glass up against the other portions of the rubber, and in order to thus uniformly flatten the entire length of the rubber surface against which the upper edge of the glass would be forced into engagement. However, with the provision of the rib 7, or with the provision of more readily yielding means between the edge of the glass and the base of the channel-shaped rubber strip, the wavy or uneven condition of the underside of the strip will not prevent the formation of a tight joint throughout the entire length of the edge of the glass.

Of course, it is obvious that a rubber strip of this kind can be used for different purposes and in different places, and the invention is not limited to the particular use shown in the drawings. The strip is preferably made of rubber, but it can be made of any other resilient or yielding material which will form a tight joint and in the claims the word "rubber" will be understood to mean any resilient or yielding material suitable for this purpose.

While the invention is shown and described in connection with a channel strip, it will be understood that the improvement can be used on a strip of any suitable or desired shape, for the invention is not limited to the specific construction shown and described. With the provision of the tongue or rib 7, a tight joint is insured, as explained, regardless of irregularity in the frame, thereby making a continuous and tight contact with the edge of the glass, even through the body portion of the strip might not be perfectly straight, or might be irregular at different points in its length.

Without disclaiming anything, and without prejudice to any novelty disclosed, what we claim as our invention is:

1. A rubber strip for use in forming a tight joint in any desired structure, comprising a rubber channel having an integral base portion and flexible side walls having an anchoring portion by which the strip is fastened in place on the structure, and having a flexible web disposed obliquely in the channel and integral with the base portion of the strip and adapted to engage the edge of some element of said structure, when the edge portion of said element is moved in the channel strip, said oblique web being flexed toward one side wall and toward the base, by said element, providing a tight joint between the strip and the edge of said element for the full length of said edge.

2. A structure as specified in claim 1, said web having its base portion adjacent to one side wall, and having its free edge adjacent the other side wall.

3. A structure as specified in claim 1, said element being a sliding window, whereby said rubber strip serves as a weather strip to make the window tight when closed, said web being subject to lateral flexure and distortion by the edge of the window to form a uniform tight joint.

4. A structure as specified in claim 1, said anchoring portion having side grooves, with a longitudinal opening between said grooves.

5. A structure as specified in claim 1, said anchoring portion having side grooves, with a longitudinal opening between said grooves, and a metal frame having edges engaging in said grooves.

6. A structure as specified in claim 1, said side walls converging on their inner sides toward the base.

FREDERICK C. PALENSKE.
WILLIAM A. ROBBINS.